United States Patent [19]

Louis et al.

[11] 3,857,735

[45] Dec. 31, 1974

[54] FUEL CELL SYSTEM

[75] Inventors: Gerhard Louis, Hofheim; Harald Böhm, Glashutten, both of Germany

[73] Assignee: LICENTIA Patent-Verwaltungs-G.m.b.H., Frankfurt am Main, Germany

[22] Filed: Mar. 27, 1973

[21] Appl. No.: 345,459

[30] Foreign Application Priority Data
Mar. 28, 1972 Germany............................ 2215060

[52] U.S. Cl............................................. 136/86 C
[51] Int. Cl. .......................................... H01m 27/12
[58] Field of Search ............... 136/86 C, 86 E, 86 R

[56] References Cited
UNITED STATES PATENTS

| | | | |
|---|---|---|---|
| 3,002,039 | 9/1961 | Bacon .............................. | 136/86 E |
| 3,253,957 | 5/1966 | Turner et al...................... | 136/86 C |
| 3,300,341 | 1/1967 | Gregory et al.................... | 136/86 C |
| 3,455,743 | 7/1969 | Huebscher et al................ | 136/86 C |

Primary Examiner—Winston A. Douglas
Assistant Examiner—H. A. Feeley
Attorney, Agent, or Firm—Spencer & Kaye

[57] ABSTRACT

Apparatus for regulating the quantity of water present in a reaction chamber of a fuel cell system, which has a circulating aqueous solution of electrolyte and air operated cathodes. The reaction chamber includes an anode and a cathode. The regulating apparatus includes two portions, the first of which acts to control the temperature of the electrolyte solution and the second of which controls the air throughput in the system in dependence upon the battery current. The temperature control device raises or lowers the operating temperature of the electrolyte solution in response to an increase or decrease, respectively, in the concentration of the solution with respect to the predetermined value range. The output of the air pump which supplies air to the cathodes is regulated in dependence upon the current flowing between the anode and cathode.

8 Claims, 1 Drawing Figure

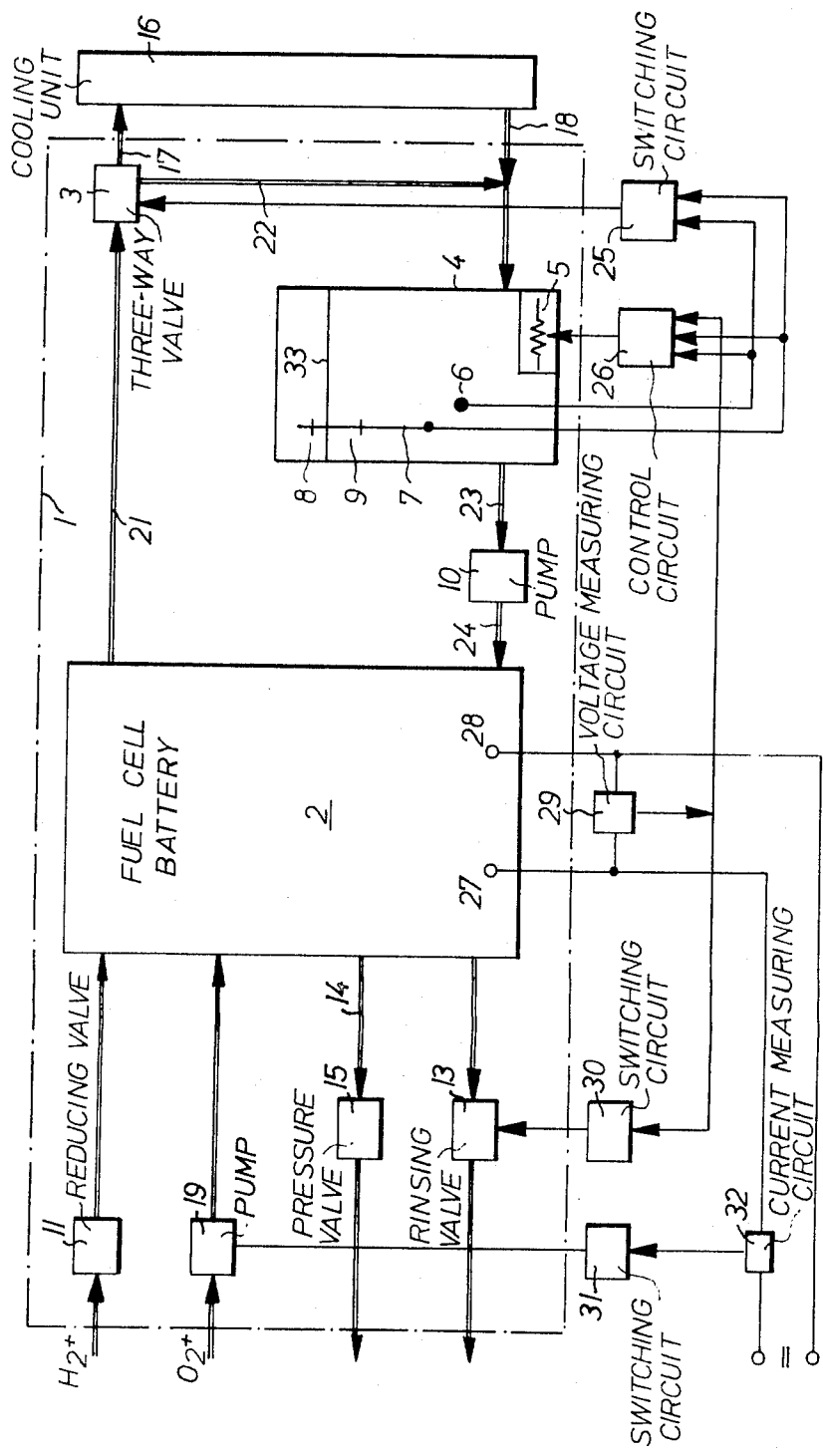

ously produced during the chemical reaction within the battery. The concentration of the electrolyte material within the solution is regulated such that its operating temperature is raised when the solution is too weak, i.e., the concentration is too low, and the temperature is lowered when the solution is too strong, i.e., the concentration is too high. This regulation of the operating temperature controls the concentration by con-
FUEL CELL SYSTEM

BACKGROUND OF THE INVENTION

The present invention relates to a fuel cell system with a circulating aqueous solution of electrolyte. The system includes a battery, i.e., a reaction chamber, having a plurality of fuel cells each of which has an anode and an air cathode. An example of this type of fuel cell is disclosed in the U.S. Pat. application Ser. No. 228,616 filed by us on Feb. 23, 1972, now U.S. Pat. No. 3,799,809.

In order for such a system to be maintenance free, the discharge of reaction water must be properly regulated, i.e., the same amount of water must be discharged per unit time as is being produced by the chemical reaction within the reaction chamber. It is necessary that such regulation of the discharge water be maintained even when the fuel cell undergoes varying operating conditions, such as, for example, variations in the current loads of the fuel cell battery, fluctuations in the air temperature and humidity, and variations in the heat insulation factor of the fuel cell system with respect to the exterior environmental conditions.

The water can be discharged by releasing it via the gas stream, if the electrodes are appropriately designed. This gas stream with the discharge water can be, preferably, released through the air cathodes, thereby eliminating the need for any special component through which the water can be discharged. In dependence upon the varying operating conditions, the corresponding amount of water in such a system will be evaporated at the gas sides of the electrodes.

In such known fuel cell systems, the operating temmperature is kept as constant as possible in order to assure uniform output of these fuel cells in spite of the strong temperature dependency of the output. Consequently, special components are required for proper regulation of the water discharge. Additionally, if the water is not discharged via the electrodes, an assembly for the reduction of water in the electrolyte and a suitable control in dependence on the electrolyte concentration are also required. If the water is discharged via the electrodes, an assembly for recovering the excess water discharged and a suitable control device therefor are required.

SUMMARY OF THE INVENTION

An object of the present invention is to provide a gas fuel cell system which assures completely maintenance free operation with uniform available output under variable operating conditions without the need for any additional equipment for either the removal or the recovery of water.

This objective is accomplished in accordance with the present invention in that the operating temperature of the fuel cell battery is regulated in dependence on the concentration of electrolyte in the aqueous solution. This aqueous solution includes electrolyte material and water, which water includes the reaction water produced during the chemical reaction occurring within the battery. The concentration of the electrolyte material within the solution is regulated such that its operating temperature is raised when the solution is too weak, i.e., the concentration is too low, and the temperature is lowered when the solution is too strong, i.e., the concentration is too high. This regulation of the operating temperature controls the concentration by controlling the quantity of water in the solution. The electrolyte for such a fuel cell may be a 2-normal $H_2SO_4$ solution.

It is additionally desirable within the context of the present invention to utilize an air pump for controlling the air flow into the battery in proportion to the battery current, so that the air flow increases with the load conditions. Such a relationship between the flow of air being supplied to the battery and the battery current helps to eliminate the production of excess water within the fuel cell system.

Furthermore, it is also possible through the use of a pressure valve to control the gas pressure within the air cathodes in relation to the air flow so as to assist in the regulation of the quantity of water removed from the system. By adjusting the minimum pressure of the pressure valve and the maximum pump output of the air pump, the water discharge characteristic of the fuel cell system can be set so as to present optimum operating properties. By so setting the water discharge characteristic of the system, the removal of heat and discharge water is regulated such that when there is a small load on the system the air flow through the cathodes barely covers the oxygen requirements of the system, thereby minimizing the removal of heat and discharge water, and when there is a high load the excess air being supplied to the battery is great enough that the necessary amount of reaction water is removed from the system, in the form of vapor, through the air stream.

BRIEF DESCRIPTION OF THE DRAWING

The FIGURE is a schematic diagram of an embodiment of a fuel cell system according to the present invention.

DESCRIPTION OF THE PREFERRED EMBODIMENTS

As shown in the FIGURE, one, or more, hydrogen/air fuel cell batteries 2, each having anodes and cathodes, are arranged within a temperature-insulated housing 1. A three-way valve 3, also located within housing 1, provides for the circulation of the electrolyte solution between the battery 2 and an electrolyte vessel 4. Located within the vessel 4 are an electrolyte heater 5, a temperature sensor 6 for measuring the temperature of the electrolyte solution and a fill level gauge 7 with upper and lower contact markers 8, 9, respectively, for determining the quantity of electrolyte solution within the vessel 4. An electrolyte pump 10 recycles the electrolyte solution from the vessel 4 back into the battery 2. A preset reducing valve 11 is connected to the battery 2 to supply its anodes with hydrogen and a valve 13 is connected behind the battery for rinsing the associated hydrogen chambers. Additionally, a pressure valve 15 is disposed in the oxygen (air) flow path in line 14.

An electrically operated air pump 19, which can be operated manually from outside of the housing 1, is also provided within the insulated housing 1 for supplying the cathodes of the battery 2 with oxygen. The air pump 19 can be manually operated when the fuel cell system is to be started up without the use of an external current source.

The three-way valve 3 is an electrically controlled valve of any well known type. Such a valve, in response to electrical inputs, will direct the input flow in either of two output flow directions, which in the fuel cell system shown would be to a cooling unit 16 or directly to the vessel 4.

The electrolyte cooler 16, arranged outside of the insulated housing 1, is connected via a line 17 with the three-way valve 3 and via a line 18 with the electrolyte vessel 4. The cooling unit for the electrolyte must be a non-corroding type, such as a DuPont heat exchanger immersion coil that is made of thin polytetrafluorethylene tubes.

Electrolyte solution is drawn out of the battery 2 and fed to the three-way valve 3 through an electrolyte discharge line 21. The electrolyte solution then flows from this valve 3 either directly through a line 22 into the electrolyte vessel 4 or through a line 17 into the electrolyte cooler 16 and then through line 18 into the electrolyte vessel 4. The pump 10 then recycles the electrolyte solution from the vessel 4 back into the battery 2 through lines 23 and 24. Thus, in this manner the electrolyte solution is caused to flow in and out of the battery 2 in a closed circuit.

The direction along which the three-way valve 3 feeds the electrolyte solution is controlled by a switching circuit 25 in dependence upon the measuring voltages produced by the electrolyte temperature sensor 6 and the fill level gauge 7. The operation of the electrolyte heater 5 is controlled by a switching member 26 in dependence upon the measuring voltages produced by the temperature sensor 6, the fill level gauge 7 and a voltage measuring circuit 29 connected across the output terminals 27 and 28 of the battery 2. The rinsing valve 13 is controlled by a switching circuit 30 which in turn is controlled by the voltage from the voltage measuring circuit 29. The operation of the air pump 19 is controlled by a switching circuit 31 operated in dependence on the current flowing between the anode and cathode within the battery which is measured by a battery current measuring circuit 32.

The operation of the system for the purpose of regulating the quantity of water in the battery will now be explained in detail. For accomplishing the desired regulation, the operating temperature of the electrolyte solution in the battery 2 is regulated in dependence on the quantity of electrolyte solution in the vessel 4 and the air passing through the cathodes of the battery 2 is regulated in dependence on the load current of the battery.

If the electrolyte level 33 in the vessel 4 reaches the lower measuring contact 9 of the fill level gauge 7, thereby indicating that too much water is being discharged from the system, the fill level gauge 7 provides a signal to switching circuit 25. The switching circuit 25 in response to this signal switches the three-way valve 3 in such a way that the electrolyte solution passes through cooler 16, which accordingly is switched on. This lowers the operating temperature of the electrolyte and, consequently, also of the electrodes of the battery 2 so that less water is allowed to evaporate from the system.

If the electrolyte level 33 reaches the upper measuring contact 8 of the fill level gauge, the fill level gauge emits a signal to the switching circuit 26 which then actuates the electrolyte heater 5. The switched on electrolyte heater raises the operating temperature of the electrolyte so as to increase the quantity of water being evaporated, thereby reducing the quantity of water within the system.

In such a system, it is advisable to provide the air cathodes with such dimensions that the air throughput required for the maximum possible amount of water involved can be obtained while eliminating the need for a separate component for removal of reaction water.

The principal function of the control circuit 26 is switching on the electrolyte heater 5 when the electrolyte level gauge 7 reaches mark 8 or when the electrolyte temperature sensor 6 measures less than 40° C, but such switching will only be possible if to the voltage measuring circuit 29 there is applied a battery voltage exceeding a minimum value.

Thus the control circuit 26 gives security against too low battery temperature and too low battery voltage and also serves as a starting device for the fuel cell.

Another switching circuit 25 belonging to the three-way valve switches on when the electrolyte level gauge 7 reaches mark 9, but only if the temperature sensor 6 measures more than 40° C or if the latter measures more than 90° C.

The result is a protection of the fuel cell against too low electrolyte level as well as too high and too low temperatures.

In order to further increase the efficiency of the total system it is additionally advantageous to control the throughput of air for the cathodes. With increases in the battery load current flowing between the anode and cathode, the current measuring circuit 32 sends a corresponding signal to a switching circuit 31 which controls the air pump 19 so that its output is also increased, either proportionally or in stages. Consequently, the amount of water removed from the air cathodes through the air stream is increased with increases in the load current.

The pressure valve 15 ensures that a certain minimum pressure is available for the perfect operation of the air cathodes when the air pump 19 is switched on. The operation of the valve 15 is independent of the output of the pump, in that this valve only opens when a minimum pressure level is reached within the system.

By adjusting the minimum pressure level of the pressure valve 15 and the pump output of the air pump 19, the water discharge characteristic of the fuel cell system can be set such that with a small load on the system the air throughput of the cathodes barely covers the oxygen requirement and very little heat and water are discharged, while with a high load the excess air is great enough that the necessary amount of reaction water is efficiently removed from the system.

The dependence of the water removal rate in relation to the battery load forms the "water discharge characteristic."

The flow rates of the air pump 19 are, under maximum load conditions 4 liters/watthours, and under minimal load conditions 1 liter/watthour.

The pressure level of valve 15 is roughly given by the minimal pressure necessary for a satisfactory operation of the cathodes, i.e., 200 mm watercolumn.

The regulation of the discharge of water from the fuel cell system in coordination with controlling the operating temperature of the fuel cell battery is highly advantageous for batteries having carbon cathodes, since the electrical output of such batteries only slightly depends on the operating temperature, the variation being 10% or less between 40° and 90° C operating temperatures. This eliminates the need for dimensioning the fuel cell battery to have a reserve volume.

The operating temperature of the battery 2 is thus maintained between 40° and 90° C in that the electrolyte temperature indication produced by sensor 6 acts on the heater 5 or the cooler 16 when the respective limit temperatures are reached. This regulation is further supported by the regulation of the air throughput at the cathodes in dependence on the battery current. The output of the air pump 19, and thus the amount of water removed from the cathodes, is increased with increasing battery current.

This type of regulation of the water consumption can be used for all fuel cell systems with circulating electrolyte, even if they are of the type which does not have suitable air cathodes and in which the removal of the water takes place, for example, in a separate assembly operating according to the evaporation principle.

The present invention provides a simple fuel cell system for the continuous, maintenance free production of current under environmental conditions of from about −10° to +50° C air temperature. Such a system eliminates the need for complicated and expensive control assemblies which are subject to malfunction, such as, for example, gas pumps for fuel gases, slot-type water evaporators and exhaust air condensers for the recovery of water.

It will be understood that the above description of the present invention is susceptible to various modifications, changes and adaptations, and the same are intended to be comprehended within the meaning and range of equivalents of the appended claims.

We claim:

1. In a fuel cell system including a fuel cell battery having a reaction chamber; an anode and cathode means within the reaction chamber; closed circuit means for circulating an aqueous solution of electrolyte through the reaction chamber; and regulating means for regulating the discharge of water by evaporation from said reaction chamber to effect a rate of water discharge substantially equalling that of the production of water in the reaction chamber, whereby the quantity of water determining the concentration of the circulating aqueous solution is maintained substantially constant, the improvement wherein said regulating means comprises in combination:
   a. monitoring means connected to said closed circuit means for sensing the quantity of said aqueous solution with respect to a predetermined value range; and
   b. temperature control means for regulating the temperature of the aqueous solution to affect the rate of evaporation of the aqueous solution in the reaction chamber, said temperature control means being connected to said closed circuit means and said monitoring means for raising the operating temperature of said aqueous solution when the quantity of said aqueous solution is above the predetermined value range and lowering the operating temperature of the aqueous solution when the quantity of the aqueous solution is below the predetermined value range.

2. A fuel cell system as defined in claim 1 wherein said cathode means is an air cathode means and said regulating means further comprises: air pump means connected to the reaction chamber for supplying air thereto; current measuring means connected between the anode and cathode means for measuring the current flowing therebetween; and first control means coupled to the output of the current measuring means for controlling the air flow produced by said air pump means in proportion to the current in the fuel cell system, whereby the cathode means are only supplied with the minimum required amount of air when the fuel cell system is under no load conditions.

3. A fuel cell system as defined in claim 2 wherein said regulating means further comprises: a pressure valve connected to the gas chambers of the cathodes for controlling the pressure within such chambers; and second control means connected to said pressure valve and said air pump for adjusting the minimum pressure level of said pressure valve and the maximum pump output level of said air pump means so as to set the water discharge characteristic of the fuel cell system.

4. In a fuel cell system including a fuel cell battery having a reaction chamber; an anode and cathode means within the reaction chamber; closed circuit means for circulating an aqueous solution of electrolyte through the reaction chamber; and regulating means for regulating the discharge of water by evaporation from said reaction chamber to effect a rate of water discharge substantially equalling that of the production of water in the reaction chamber, whereby the quantity of water determining the concentration of the circulating aqueous solution is maintained substantially constant, the improvement wherein said regulating means comprises in combination:
   a. a vessel connected in said closed circuit;
   b. a gauge means disposed in said vessel and having an upper mark and a lower mark for sensing a predetermined high level and low level, respectively, of the aqueous solution in said vessel;
   c. heating means in said closed circuit for contacting the aqueous solution, said heating means having an activated state and a de-activated state;
   d. cooling means in said closed circuit for contacting the aqueous solution, said cooling means having an activated state and a de-activated state; and
   e. circuit means connected to said heating means, said cooling means and said gauge means for activating said heating means when the level of the aqueous solution reaches said upper mark and for activating said cooling means when the level of the aqueous solution reaches said lower mark, whereby the temperature of the aqueous solution is controlled as a function of its quantity in said closed circuit, the temperature of the aqueous solution affecting its rate of evaporation in said reaction chamber.

5. A fuel cell system as defined in claim 4, wherein said heating means is disposed in said vessel.

6. A fuel cell system as defined in claim 4, said cooling means comprising a valve connected in said closed circuit, said valve having an inlet, a first outlet and a second outlet, said inlet being connected to an outlet of said reaction chamber, said first outlet being connected to an inlet of said vessel; and a cooling unit having an inlet connected to said second outlet of said valve and an outlet connected to an inlet of said vessel; said circuit means being connected to said valve for switching said valve into a first position in which the aqueous solution flowing from said reaction chamber is routed through said cooling unit into said vessel and for switching said valve into a second position in which the aqueous solution flowing from said reaction chamber is routed directly into said vessel; in the first position of said valve said cooling means is in said activated state, and in the second position of said valve said cooling means is in said de-activated state.

7. A fuel cell system as defined in claim 4, further including a temperature sensing means in said closed circuit for sensing the temperature of the aqueous solution, said temperature sensing means being connected to said circuit means for activating said heating means when the temperature of the aqueous solution falls below a predetermined value and to activate said cooling means when the temperature of the aqueous solution exceeds a predetermined value.

8. A fuel cell system as defined in claim 7, further including voltage measuring means connected between output terminals of said battery for sensing the voltage thereof, said voltage measuring means being connected to said circuit means for allowing said circuit means to activate said heating means only when the battery voltage exceeds a minimum value.

* * * * *